(12) United States Patent
Tumback

(10) Patent No.: US 6,811,508 B2
(45) Date of Patent: Nov. 2, 2004

(54) HYBRID TRANSMISSION, PARTICULARLY FOR MOTOR VEHICLES

(75) Inventor: Stefan Tumback, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/275,163

(22) PCT Filed: Mar. 23, 2001

(86) PCT No.: PCT/DE01/01120
§ 371 (c)(1),
(2), (4) Date: Mar. 7, 2003

(87) PCT Pub. No.: WO01/83249
PCT Pub. Date: Nov. 8, 2001

(65) Prior Publication Data
US 2003/0166429 A1 Sep. 4, 2003

(30) Foreign Application Priority Data
May 2, 2000 (DE) .......................................... 100 21 025

(51) Int. Cl.[7] ............................. F16H 3/72; B60K 1/02
(52) U.S. Cl. ............................................. 475/5; 477/3
(58) Field of Search .......................... 475/5, 65.2, 65.3, 475/65.4; 180/65.2, 65.3, 65.4; 477/3

(56) References Cited

U.S. PATENT DOCUMENTS

| 4,588,040 | A | | 5/1986 | Albright | |
|---|---|---|---|---|---|
| 5,558,589 | A | | 9/1996 | Schmidt | |
| 5,558,595 | A | | 9/1996 | Schmidt | |
| 5,571,058 | A | | 11/1996 | Schmidt | |
| 5,730,676 | A | | 3/1998 | Schmidt | |
| 5,775,449 | A | | 7/1998 | Moroto | |
| 5,935,035 | A | | 8/1999 | Schmidt | |
| 6,090,005 | A | * | 7/2000 | Schmidt et al. ................. | 475/5 |
| 6,558,283 | B1 | * | 5/2003 | Schnelle ......................... | 475/5 |
| 2002/0189397 | A1 | * | 12/2002 | Sakamoto et al. ............ | 74/661 |
| 2003/0100395 | A1 | * | 5/2003 | Hiraiwa ......................... | 475/5 |

FOREIGN PATENT DOCUMENTS

WO             00 26053 A     5/2000

* cited by examiner

Primary Examiner—Roger Pang
(74) Attorney, Agent, or Firm—Michael J. Striker

(57) ABSTRACT

A transmission (15; 15a; 15b; 15c). In particular for motor vehicles, has two planetary gear sets (16; 16c; 17; 17c;), the ring gears (18; 18c; 19) of which are coupled with the crankshaft (11; 11a; 11c) of an internal combustion engine by means of a toothed ring (12). Each of the planetary gear sets (16; 16c, 17) is coupled with an electrical machine (26, 27) and a transmission shaft (31, 32) on which input gears (1E through 5E, RE) for various conversion ratios are arranged. The input gear wheels (1E through 5E, RE) mesh with output gear wheels (1A through 5A, RA) arranged on an output shaft (40; 40a; 40c). According to the invention, it is provided that the electrical machines and/or the planetary gear sets (16; 16c, 17; 17c) are bridged in order to enhance the overall efficiency level during constant driving conditions. A pair of gear wheels can be used for this purposed, for example, that couples the input shaft (11) with a transmission shaft (31, 32).

11 Claims, 4 Drawing Sheets

HYBRID TRANSMISSION, PARTICULARLY FOR MOTOR VEHICLES

BACKGROUND OF THE INVENTION

The invention concerns a transmission, in particular for motor vehicles, with an input shaft coupled with at least one power-splitting gear set that is capable of being coupled with an output shaft and with two electrical machines coupled with the at least one power-splitting ear set.

A transmission of this type was made known in U.S. Pat. No. 5,571,058. It has an input shaft that is coupled with power-splitting gear sets that are capable of being coupled with an output shaft. Each of the power-splitting gear sets is coupled with one of the electrical machines.

To enhance the overall efficiency level—which is to be achieved during constant driving conditions in particular—four different driving conditions are possible. For this purpose, a clutch is provided for each driving condition, i.e., four clutches are required. Power flow always takes place through at least one of the six epicyclic gear sets in all. As a result, the design of this transmission is very complex. Weight and costs are increased as a result.

Moreover, a transmission is made known in U.S. Pat. No. 5,558,589 in which power flow always takes place through at least one epicyclic gear set. A plurality of clutches is provided in this case as well, which also results in increased costs.

SUMMARY OF THE INVENTION

In contrast, the transmission according to the invention, in particular for motor vehicles, has the advantage that is has a simpler design yet still features good efficiency levels. For this purpose, means are provided for coupling the input shaft with the output shaft while the electrical machines and the epicyclic gear sets are bridge. The means serve to couple the input shaft with the output shaft while the electrical machines are bridged and relative motions of the gear-set components of the epicyclic gear sets are suppressed.

Even when the electrical machine and the epicyclic gear set are bridged, the electrical machine can still work under load, i.e., in boost mode, to recuperate braking energy, and to operate as an alternator. The vehicle can still be operated with the full comfort of continuously-variable changes in conversion ratios even in the limp-home operating mode, i.e., if an electrical machine fails.

A positive connection of the input shaft with a transmission shaft prevents wear induced by friction couplings. The design is particularly simple when a pair of gear wheels is located between the input shaft and a transmission shaft.

Moreover, the use of two transmission shafts makes it possible to shift gears without disengaging the power transmission. The use of two electrical machines also makes it possible to obtain a continuously-variable conversion ratio in the range between two fixed ratios.

BRIEF DESCRIPTION OF THE DRAWINGS

Exemplary embodiments of the invention are presented in the drawings and are explained hereinbelow in greater detail.

DETAILED DESCRIPTION OF THE PREFERRED EMBODIMENTS

Figure 1:
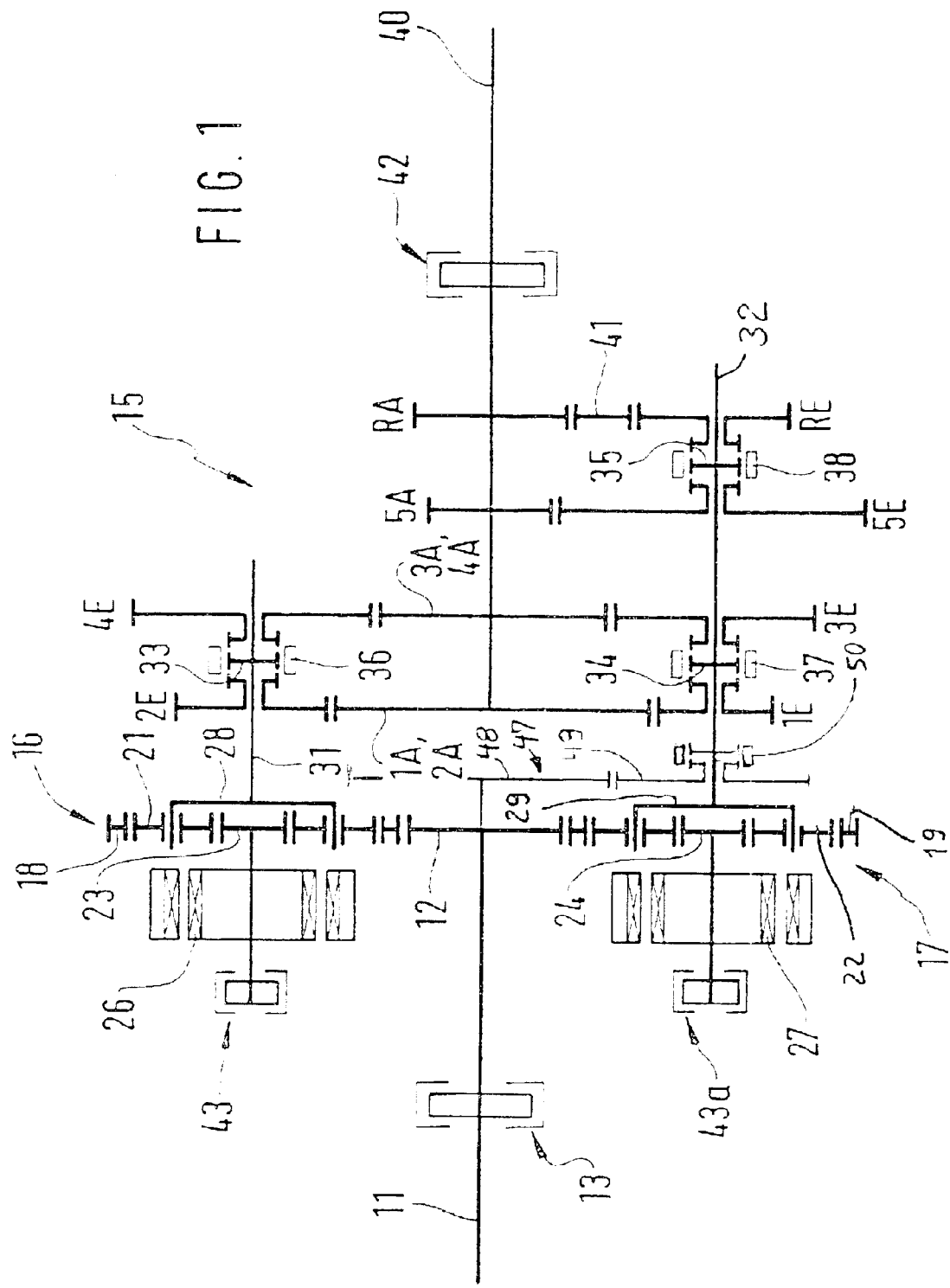
FIG. 1 is a schematic representation of a first transmission according to the invention.

A portion of the drivetrain of a motor vehicle is shown in FIG. 1. The drivetrain includes, among other things, the crankshaft 11 of an otherwise not shown internal combustion engine, on the end of which a toothed ring 12 is located. Furthermore, the crankshaft 11 cooperates with an exhaust brake 13. As an alternative, a one-way clutch can be used in place of the exhaust brake 13. It is also possible for neither an exhaust brake 13 nor a one-way clutch to be provided. A transmission 15 that is developed as a three-shaft transmission in the exemplary embodiment is capable of being coupled to the toothed ring 12.

The transmission 15 has two power-splitting gear sets, preferably identical epicyclic gear sets, in particular two planetary gear sets 16, 17. Each planetary gear set 16, 17 has—as is known per se—one internal-geared and one external-geared ring gear 18, 19, a plurality of planet gears 21, 22 and a sun gear 23, 24. The coupling of the transmission 15 to the toothed ring 12 takes place via the external teeth of the ring gears 18, 19 of the planetary gear sets 16, 17. Each sun gear 23, 24 is coupled with an electrical machine 26, 27 on the side of the planetary gear sets 16, 17 that is closest to the crankshaft 11. The electrical machines 26, 27 coupled to each other, e.g., via an intermediate electrical circuit, and coupled with the inboard battery of the motor vehicle, are equipped with power electronics for four-wheel drive. The planetary carriers 28, 29 of the planetary gear sets 16, 17 are coupled with transmission shafts 31, 32—which are preferably countershafts—on the side furthest from the electrical machines 26, 27.

The two transmission shafts 31, 32 carry the input gear wheels 1E through 5E and RE of a 5-speed manually-shifted transmission. In order to couple the input gear wheels 1E through 5E and RE—which can move freely on the transmission shafts 31, 32—with the transmission shafts 31, 32, a gear wheel 33, 34, 35 is situated in torsion-resistant fashion on said transmission shafts between input gear wheels 2E and 4E, input gear wheels 1E and 3E, and input gear wheels 5E and RE. Gear wheels 33, 34, 35 can be moved into mesh with the respective input gear wheel 1E through 5E and RE using electrically-actuatable sliding sleeves 36, 37, 38 and dog clutches, thereby establishing a friction coupling between them. Instead of electrical actuation, another type of actuation, e.g., hydraulic actuation, is also feasible.

Input gear wheels 1E through 5E and RE mesh with output gear wheels 1A through 5A and RA, which are situated on an output shaft 40 in torsion-resistant fashion, whereby an idler gear 41 is also located between the input gear wheel RE and the output gear wheel RA. In order to lock up or arrest the output shaft 40, said output shaft further cooperates with a brake 42. The brake 42 can also be the service brake of the motor vehicle.

Moreover, a pair of gear wheels 47 is located between the crankshaft 11 and the transmission shaft 32. One gear wheel 48 is situated in torsion-resistant fashion on the crankshaft 11, and one gear wheel 49 is situated on the transmission shaft 31. Another gear-shift component 50—which is preferably a dog clutch—is provided between the gear wheel 49 on the transmission shaft 31. As an alternative, synchromesh gear-shift components 50 or multiplate clutches can be used. The pair of gear wheels 47 and the gear-shift component 50 therefore represent means for coupling the input shaft 31 with the output shaft 40 while the two electrical machines 26, 27 and the epicyclic gear set 16 are bridged. The pair of gear wheels 47 and the gear-shift component 50 hereby serve to establish a positive coupling of the crankshaft 11 with the transmission shaft 31 and, therefore the output shaft 40.

As an alternative, it is also possible to provide the pair of gear wheels 47 between the transmission shaft 32, or two pairs of gear wheels 47 between the two transmission shafts 31, 32. In place of the pair of gear wheels 47, it is also possible, e.g., to use a toothed belt, a chain or other suitable means to bridge the electrical machines 21, 22 and the epicyclic gear set 16, 17. When the crankshaft 11 and the output shaft 40 are in alignment with each other, as shown in FIG. 1, their facing ends can also be coupled directly via interlocking. This is feasible in the case of a constant high speed.

Various operating modes will be described hereinbelow, which can be realized with the transmission 15 described hereinabove, whereby the open-loop and closed-loop control of the transmission 15 and the internal combustion engine take place by means of electronic control units: to start the internal combustion engine of the motor vehicle when the vehicle is at stationary idle, the brake 42 is activated; this means that the output shaft 40 is locked up. Moreover, one gear is engaged on each of the two transmission shafts 31, 32, e.g., first gear and second gear, and the sliding sleeves 37, 38 overlap the appropriate input gear wheels 1E and 2E for this purpose. By engaging one gear on each of the transmission shafts 31, 32, the planetary carriers 28, 29 of the planetary gear sets 16, 17 are held stationary, i.e., they cannot rotate, when cranking torque is introduced through the sun gears 23, 24. The two electrical machines 26, 27 are now driven as motors by the inboard battery. The torque introduced into the sun gears 23, 24 by the electrical machines 26, 27 thereby causes—via the rotating planet gears 21, 22—the respective ring gear 18, 19 to rotate, which, in turn, drives the toothed ring 12 of the crankshaft 11 with the required cranking speed, which starts the internal combustion engine.

A common and reasonable layout of the planetary gear sets 16, 17 results in a cranking conversion ratio of approximately 4:1. Assuming that the torque required to crank an internal combustion engine lies in the magnitude of approximately 200 Nm, each electrical machine 26, 27 acting as an electric motor must therefore provide approximately 25 Nm of torque. This required torque level also determines the physical size and rating class of the electrical machines 26, 27.

It shall also be noted here that the two electrical machines 26, 27 are driven in the start mode, i.e., with the planetary carriers 28, 29 held stationary, by the internal combustion engine via the toothed ring 12 after the internal combustion engine is started. Due to the hereinabove-mentioned conversion ratios of the planetary gear sets 16, 17, the electrical machines 26, 27 are then driven at approximately four times the speed of the internal combustion engine. To avoid exceeding the limit speeds of the electrical machines 26, 27, the speed of the internal combustion engine should be limited during the start mode in this case.

The normal operation of the motor vehicle will be described hereinbelow, during which the motor vehicle moves at a uniform speed or a changing speed. In this case, one gear is engaged on each of the transmission shafts 31, 32 in the transmission 15, e.g., second and third gear. The appropriate gear wheels 2E and 3E are therefore friction-coupled with gear wheels 2A and 3A on the output shaft 40. A defined relationship exists between the rotational speeds of the two planetary carriers 28 and 29 in accordance with the conversion ratios between second and third gear, whereby the planetary carrier 28 of second gear turns at a faster rotational speed than the planetary carrier 29 of third gear. Furthermore, the rotational speed of the output shaft 40 is proportional to the driving speed of the motor vehicle. Since the ring gears 18, 19 driven by the internal combustion engine turn at the same rotational speed when the planetary gear sets 16, 17 are identical, this results in defined rotational speeds of the sun gears 23, 24 coupled with the electrical machines 26, 27. If the rotational speed level of the two electrical machines 26, 27 is now changed, the relationship between the speed of the internal combustion engine and the rotational speed of the output shaft 40 also changes, while the speed of the internal combustion engine remains constant. In other words, this means that varying the speed level of the electrical machines 26, 27 results in a (continuously variable) variation of the conversion ratio when gears are securely engaged on the transmission shafts 31, 32.

Given a torque level predetermined by the internal combustion engine and a required drive torque at the output shaft 40, a fixed, predetermined cumulative torque level results at the two electrical machines 26, 27. Furthermore, the relationship between the torque level of the internal combustion engine and the cumulative torque level at the two electrical machines 26, 27 remains fixed as long as a brake is not operated. The instantaneous torque level of the internal combustion engine can therefore be derived very precisely from the cumulative torque level of the two electrical machines 26, 27, which is known from its open-loop control. Knowing the instantaneous torque level of the internal combustion engine is helpful for coordinated electronic drivetrain and engine control, and it can simplify or improve it.

By splitting the torque over the two transmission shafts 31, 32, the cumulative torque level of the two electrical machines 26, 27 can be distributed arbitrarily between them. Since the two electrical machines 26, 27 have different speeds due to the fact that different gears are engaged on the two transmission shafts 31, 32, the electrical output of the two electrical machines varies as well.

It is particularly advantageous during normal operation to allow the two electrical machines 26, 27 to operate as alternators that only generate the energy and/or output required by the vehicle electrical system. As a result, given a certain required electrical output of the two electrical machines 26, 27, a certain speed of the two electrical machines 26, 27 and, therefore, a certain conversion ratio of the transmission 15, is set. The continuously variable changing of the conversion ratio that is possible within certain limits with the electrical machines 26, 27 is obtained solely by the fact that the electrical output required by the vehicle electrical system is divided between the two electrical machines 26, 27 acting as alternators, whereby a splitting of power—with its inherent losses—between the two electrical machines 26, 27 does not occur.

It is sufficient if the spacing of the conversion ratio made possible with the two electrical machines 26, 27 covers a relatively small range, since greater changes in the conversion ratio can be realized by changing gears. If the possible spacing for a gear, e.g., at low vehicle electrical system outputs, is insufficient, it can be increased by either permitting power to flow between the two electrical machines 26, 27—with the inherent losses—or by increasing the electrical output to charge the inboard battery above the level actually required by the vehicle electrical system.

During constant driving conditions, continuously variable gear-ratio adjustments are of minor significance, however. A mechanical "reaching-through" the transmission by means of the pair of gear wheels 47 and the gear-shift component 50 bridges the power-splitting part of the transmission represented by the epicyclic gear set 16, 17, and kinematically couples the internal combustion engine with output shaft 40. Using the gear selector, a selection can be made between a plurality of fixed gear ratios. This improves the overall efficiency level of the transmission 15—which also includes the efficiency level of the electrical power transmission during continuously variable vehicle operation.

By means of this kinematic coupling and the aforementioned bridging, the rotational speeds of the electrical machines 26, 27 are set simultaneously. The torque levels and, therefore, the electrical power flows are no longer coupled to the propulsive power of the vehicle. The vehicle electrical system can also be controlled freely, e.g., in the fashion of a "boost function". Additional power is then furnished the vehicle from the battery. As an alternative, a "recuperation" of braking energy can be realized. Additionally, a circular power flow (reactive power) that can otherwise occur under certain driving conditions can be prevented by means of the mechanical "reaching-through" the transmission.

A shift sequence occurs in detail as follows:

1. During continuously variable operation, the speed of the internal combustion engine is adjusted so that the conversion ratio i=speed of internal combustion engine/rotational speed of output shaft 40 corresponds to the fixed conversion ratio via the pair of gear wheels 47 and one of the conversion ratios 1E/1A, 3E, 3A, 5E/5A or RE/RA. The gear wheel 49 and the idler gear of the pair of gear wheels 47 then turn synchronously with the transmission shaft 32.

2. The gear-shift component 50 is closed. Now power flows from the crankshaft 11 through the pair of gear wheels 47, the gear-shift component 50—while the epicyclic gear sets 16, 17 and the electrical machines 26, 27 are bridged—through the transmission shaft 31, one of the gear-shift components 37, 38, from one of the gear wheels 1E, 3E, 5E to one of the gear wheels 1A, 3A, 5A, and finally to the output shaft 40.

3. The electrical machines 16, 17 can now be switched off or controlled according to other criteria. Transfer of power to the wheel is ensured, however.

Before the gear-shift component 50 or the mechanical "reaching-through" the transmission is opened, the pair of gear wheels 47 is first unloaded by means of a suitable control of the electrical machines 16, 17. The gear-shift component 50 is then opened. The conversion ratio that results from the pair of gear wheels 47 must be adapted to the requirements of the aforementioned driving conditions. Advantageously, at least one of the selectable conversion ratios is therefore designed as overdrive, i.e., it has a gear ratio of 0.6 to 0.8, for example.

In the layout shown, it is further possible, by means of a constant gear level, to realize various fixed gear ratios, one of which is designed as overdrive. It is also advantageous to configure the ratios in such a fashion that, when the epicyclic gear sets 16, 17 are bridged, favorable operating points of the electrical machines 26, 27 are realized. At the least, they should be designed so that enough current can be produced with a good level of efficiency to operate the vehicle.

A gear change in the transmission 15 will now be explained, which said gear change is necessary to change the conversion ratio when, e.g., the internal combustion engine must make a faster driving speed possible at a certain engine speed and a correspondingly greater load. As an example, it will be assumed that the gears will be shifted from third to fifth gear on the second transmission shaft 32, while fourth gear remains engaged on the first transmission shaft 31. Before the gear change actually takes place, the electrical machine 27 associated with the second transmission shaft 32 is switched without load, which causes the torque in the second transmission shaft 32 to become nearly zero, except for a small amount of torque resulting from the inertia of the components. In this state, power flows exclusively through the first transmission shaft 31, whereby the electrical machine 26 associated with it supports a portion of the drive torque and can thereby function as a motor or an alternator. As soon as the second transmission shaft 32 is load-free, the engaged third gear can be disengaged by separating the dog clutch and moving the sliding sleeve 37. The electrical machine 27 for the second transmission shaft 32 then produces the required synchronization speed, and the second transmission shaft 32 is turned at a rotational speed that matches the rotational speed of the gear wheel 5E of fifth gear driven by the output shaft 40. When this has taken place, power flow is established between the second transmission shaft 32 and the gear wheel 5E by moving the sliding sleeve 38. The electronic control of the transmission 15 can determine the rotational speed required to synchronize the second transmission shaft 32 based on the rotational speeds of the electrical machine 26 and the internal combustion engine. No additional sensors are required on the transmission shafts 31, 32 to detect rotational speed.

The other gear changes for upshifts or downshifts take place in similar fashion. All gear changes share a common characteristic, namely that power transmission always takes place between the crankshaft 11 of the internal combustion engine and the output shaft 40 via one of the two transmission shafts 31, 32, so that gear changes can take place without disengaging power transmission.

"Hybrid" vehicles that have an electric motor as well as an internal combustion engine can be operated particularly advantageously using the transmission 15. Vehicle operation using an electric motor—which takes place during city driving to reduce air pollution, for example—is realized using the two electrical machines 26, 27 that are supplied by the inboard battery with the energy required for this. To support the torque introduced into the transmission shafts 31, 32 by the electrical machines 26, 27 and through the planetary carriers 28, 29, the ring gears 18, 19 of the planetary gear sets 16, 17 must be held stationary. This takes place in simple fashion by actuating the exhaust brake 13, which acts on the ring gears 18, 19 via the toothed ring 12.

If the internal combustion engine is to be restarted now during purely electrical driving, second gear and reverse gear are engaged in the transmission 15 for this purpose. Electrical machine 27 rotates in reverse, i.e., in the direction of rotation required to crank the engine, while electrical machine 26 is driven in the forward direction. An equally-acting, driving torque is therefore introduced into the output shaft 40 by both electrical machines 26, 27. Due to the different conversion ratios between the engaged second gear and the engaged reverse gear, a higher level of torque (supported by the exhaust brake 13) is transferred to the toothed ring 12 via ring gear 19 of the second electrical machine 27 associated with reverse gear than via ring gear 20. To actually start the internal combustion engine, however, it is therefore sufficient to release the exhaust brake 13, which causes the toothed ring 12 and the crankshaft 11 to be rotated by the second electrical machine 27 via ring gear 19 in the direction necessary to crank the internal combustion engine. When the internal combustion engine is started, reverse gear is disengaged on the second transmission shaft 32 in accordance with the gear change described hereinabove and, instead, first gear or third gear is engaged.

It should also be mentioned that, while the internal combustion engine is being cranked, a jerking motion that is unpleasant for the driver can occur as a result of torque being introduced into the drivetrain by the cranking action. Said jerking motion can be compensated by the two electrical machines 26, 27 by means of an appropriate control strategy.

The aforementioned driving of the motor vehicle exclusively by means of the electrical machines 26, 27 necessarily results in a relatively large amount of energy being drained from the inboard battery. In order to limit the necessary capacity of the inboard battery and/or to make it possible to recharge it while the internal combustion engine is operating, the operation of the two electrical machines 26, 27 as alternators was mentioned hereinabove. It is particularly advantageous to utilize the rolling energy stored in the motor vehicle during overrun to operate the electrical machines 26, 27 as alternators. To this end, the internal combustion engine is switched off during (no-load) overrun operation, and the exhaust brake 13 is activated. The two sun gears 23, 24 coupled with the electrical machines 26, 27 are therefore driven via the rotating planetary carriers 28, 29.

The transmission 15 described hereinabove can be modified in diverse fashion. For example, it can be necessary to provide an additional brake 43, 43a on at least one of the two electrical machines 26, 27. This can make it possible to start the motor vehicle moving from stationary idle with a high amount of power. This can be explained by the fact that, when the vehicle is at stationary idle, and given the aforementioned gear ratio of the planetary gear sets 16, 17 of approximately 4:1, the two electrical machines 26, 27 run approximately at four times engine speed. If a relatively high level of starting torque is now introduced into the crankshaft 11 via the internal combustion engine during transition to motion, said starting torque must be supported by the electrical machines 26, 27, which necessarily results in brief, very high electrical outputs from the electrical machines 26, 27. By using at least one additional brake 43, 43a that cooperates with at least one electrical machine 26, 27, said starting torque can be absorbed by the brake 43, 43a and converted to frictional work. The brake 43, 43a can be designed as a mechanically-acting friction brake (shoe brake or multi-disk brake). It is particularly advantageous, however, to design the brake 43, 43a as an electrodynamic retarder. This electrodynamic retarder can also act as a component of a heater system (e.g., for a water-cooled alternator), and support very high levels of torque for brief periods.

The transmission 15 is presented and described in the exemplary embodiment as a planetary-gear transmission. In place of planetary gear sets, other types of epicyclic gear sets can also be used. When planetary gear sets are used, another type of coupling of the individual elements with the components of the planetary gear sets is also feasible. For example, the internal combustion engine can also introduce its torque into the planetary carriers while the transmission shafts are coupled with the ring gears.

Figure 2:
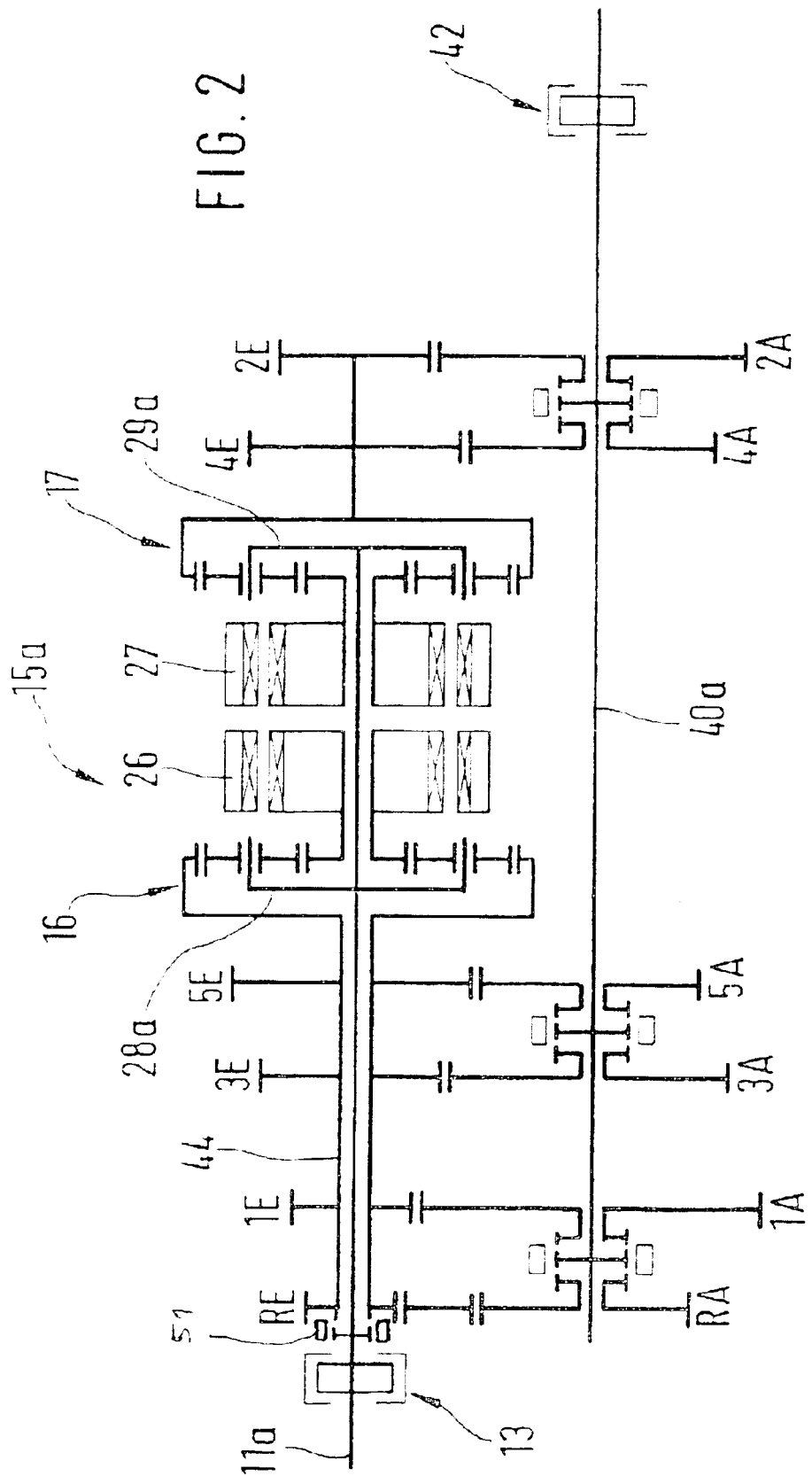
FIGS. 2 through 4 are schematic representations of transmissions derived from FIG. 1.
Figure 3:
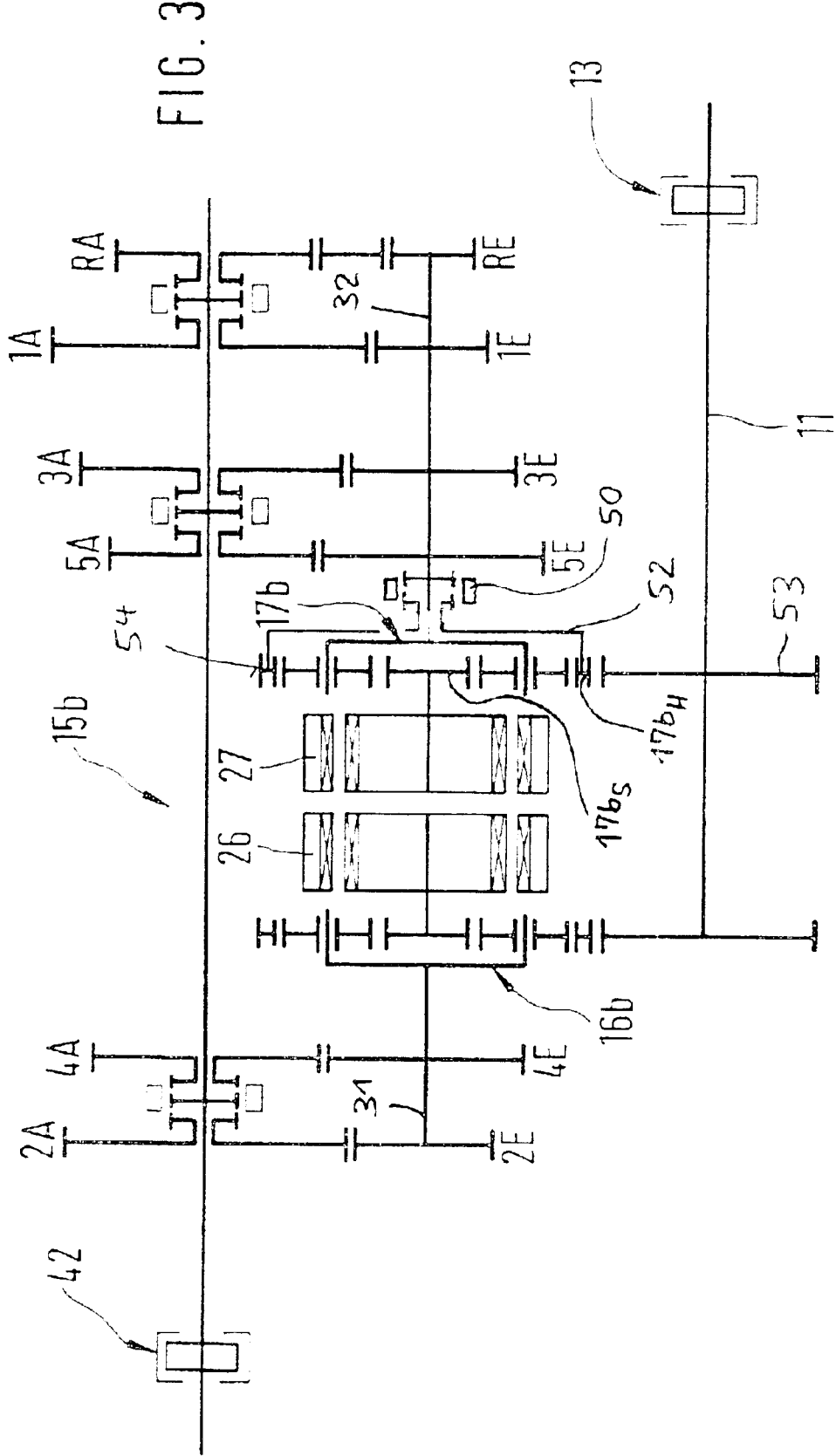
Figure 4:
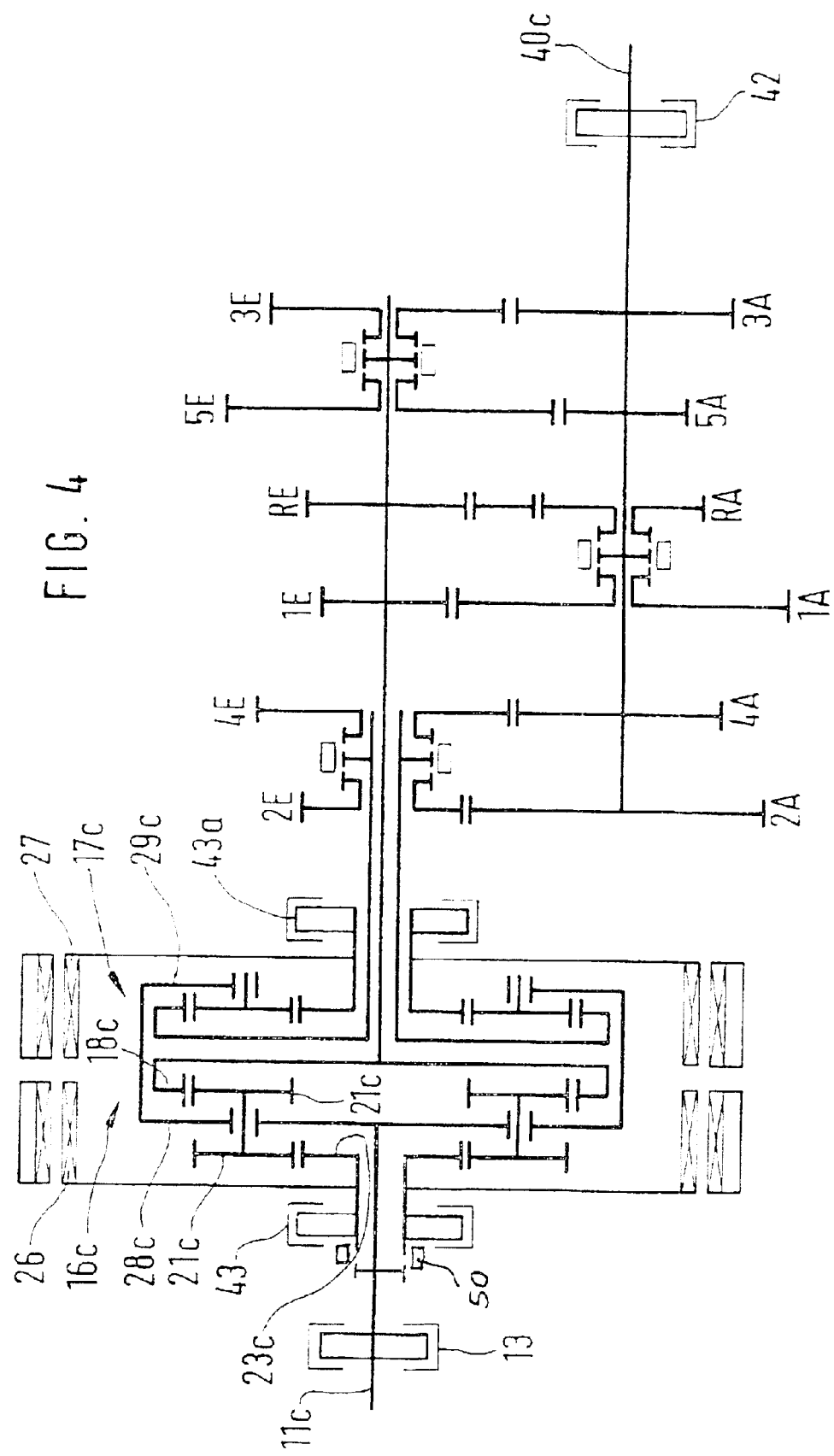

Three further variants are presented in FIGS. 2, 3, and 4:

A transmission 15a is shown in FIG. 2 that is designed not as a three-shaft transmission according to FIG. 1, but as a hollow-shaft transmission. The crankshaft 11a coupled with the planetary carriers 28a, 29a is enclosed in a hollow transmission shaft 44 on which the input gear wheels RE, 1E, 3E and 5E are located, while the input gear wheels 4E and 2E are mounted on a transmission shaft 45—as an extension of the crankshaft 11a. The input gear wheels 1E through 5E and RE cooperate with the output gear wheels 1A through 5A and RA that are located on an output shaft 40a extending in parallel with the hollow transmission shaft 44, the crankshaft 11a and the transmission shaft 45.

A device 51 such as a dog clutch, for example, is provided between the crankshaft 11a and the hollow shaft 44, which said device makes a torsion-resistant coupling of the crankshaft 11a with the hollow shaft 44 possible. A bridging of the electrical machines 26, 27 and the planetary gear sets 16, 17 is therefore obtained in a very simple fashion. A further advantage of the transmission 15a shown in FIG. 2 in particular is its narrow design.

The transmission 15b shown in FIG. 3 differs from the transmission 15 according to FIG. 1 in particular by the fact that the two electrical machines 26, 27 are located adjacent to each other, and the two planetary gear sets 16b, 17b (as in transmission 15a) are situated laterally-reversed in relation to each other. A gear-shift component 50 is located next to the planetary gear set 17b on the transmission shaft 32. The gear-shift component 50 establishes a torsion-resistant coupling of the transmission shaft 32 with a cup-shaped flange 52 integrally molded on the ring gear $17b_H$ of the planetary gear set 17b. As a result, the ring gear $17b_H$ and the planetary carrier $17b_P$ can be joined in torsion-resistant fashion, which causes them to turn at the same angular velocity. Torque is now transferred by a gear wheel 53 located on the crankshaft 11 to an external toothing 54 of the ring gear $17b_H$. The torque is transferred by the ring gear $17b_H$ through the gear-shift component 50 to the transmission shaft 32, where the four different conversion ratios 1E/1A, 3E/3A, 5E/5A or RE/RA can be selected. The gear-shift component 50 thereby serves to suppress relative motions of the gear-set components of the power gear set designed as a planetary gear set 17b, which then rotates as a block. It is possible, however, to operate the electrical machine 27, of course, which then has the same rotational speed as the transmission shaft 32, since the sun gear $17b_S$ has the same rotational speed as the ring gear $17b_H$ and the planetary carrier $17b_P$.

As an alternative, a pair of gear wheels 47 can also be provided between the crankshaft 11 and the transmission shaft 32, however, as in the first exemplary embodiment, whereby the gear-shift component 50 is located on the crankshaft 11. A relatively compact transmission can be obtained in this case as well due to the in-line layout of the two electrical machines 26, 27 and the planetary gear sets 16b, 17b, as is the case with transmission 15a.

The transmission 15c shown in FIG. 4 is a particularly advantageous variant. It differs from the transmission 15a in particular by the fact that the planet gears 21c of the planetary gears 16c are developed in duplicate and they are joined by means of a rigid shaft. The first planet gear 21c on the left side of the planetary carrier 28c meshes with the sun gear 23c coupled with the electrical machine 26. On the right side of the planetary carrier 28c, the second planet gear 21c meshes with the ring gear 18c of the drive element. This results in a very compact transmission that is similar in design to today's manually-shifted transmissions, whereby the electrical machines take up the space required for the clutch in conventional manually-shifted transmissions.

The sun gear 23c is capable of being coupled with the crankshaft 11c in torsion-resistant fashion via a gear-shift component 50 located next to the exhaust brake 43. As a result, the sun gear 23c is also capable of being coupled with the planetary carrier 28c. This results in a suppression of the relative motions of the gear-set components: planet gears 21c, sun gear 23c, and planetary carrier 28c. Since the planet gears 21c do not rotate around their own axes, the ring gear 18c is driven at the same speed. The ring gear 18c, in turn, drives the transmission shaft 32 on which the gears 1E, RE, 3E and 5E are located. Relative motions of the gear-set components can therefore be prevented with the gear-shift component 50.

As an alternative or in addition, a gear-shift component can be located next to the brake 43a. As a result of this, the 2E/2A and 4E/4A conversion ratios can be used as well.

It is also feasible, of course, to equip the transmission 15a, 15b or 15c with at least one additional brake 43, 43a in accordance with transmission 15 shown in FIG. 1.

It is also possible that only one epicyclic gear set 16, 17 and/or a power-splitting gear set to which only one electrical machine is coupled is provided in the transmission 15; 15a; 15b; 15c according to the invention. The essential point is that means are provided to couple the input shaft 31, 32 with the output shaft 40; 40a while the at least one electrical machine 26, 27 and the at least one epicyclic gear set 16; 16c, 17; 17c are bridged. Despite a simple design, this results in a high overall efficiency level. When the at least one electrical machine and the at least one epicyclic gear set are bridged, the electrical machine can still work under load, i.e., in boost operation, for recuperation and to operate as an alternator. A continuously variable changing of the conversion ratio is still possible. As a result of this, full driving comfort is ensured even in the limp-home operating mode, e.g., if one of the electrical machines 26, 27 fails.

In place of the transmission 15; 15a; 15b; 15c described in the form of a manually-shifted transmission, another transmission, e.g., a transmission in the form of a continuously variable automatic transmission, can be used.

What is claimed is:

1. A transmission (15; 15a, 15b; 15c), having an input shaft (11; 11a; 11c) that is coupled with at least one power-splitting gear set (16; 16c; 17; 17c), wherein said at least one power-slitting gear set is capable of being coupled with an output shaft (40, 40a), and having two electrical machines (26, 27) coupled with the at least one power-splitting gear set (16; 16c; 17; 17c), wherein means (47, 50, 51) are provided for coupling the input shaft (11; 11a; 11c) with the output shaft (40; 40a) while the two electrical machines (26, 27) and the at least one power-splitting gear set (16; 16c, 17; 17c) are bridged, wherein the means (47, 50, 51) serve to establish a positive-locking connection between the input shaft (11; 11a; 11c) and at least one transmission shaft (31, 32, 44) capable of being coupled with the output shaft (40, 40a), or between said input shaft and the output shaft (40; 40a), wherein the means (47) are at least one pair of gear wheels, whereby one gear wheel (48) is arranged on the input shaft (11; 11a; 11c) and at least one gear wheel (49) is arranged on at least one of the transmission shafts (31, 32), and wherein a gear-shift component (50) in the form of a dog clutch is provided between the gear wheel (48) on the input shaft (11; 11a; 11c) or the at least one gear wheel (49) on at least one of the transmission shafts (31, 32).

2. The transmission according to claim 1, wherein, to obtain a continuously variable conversion ratio, the rotational speeds of the two electrical machines (26, 27) are capable of being changed.

3. The transmission according to claim 1, wherein the input shaft (11) and the output shaft (40; 40a) each have a brake device (13, 42).

4. The transmission according to claim 1, wherein at least one electrical machine (26, 27) is mechanically linked with a brake device (43, 43a).

5. The transmission according to claim 1, wherein the transmission is provided for use in motor vehicles.

6. The transmission according to claim 1, wherein the input shaft is coupled with two power-splitting gear sets.

7. The transmission according to claim 1, wherein the at least one power-splitting gear sets are epicyclic gear sets.

8. A transmission (15; 15a; 15b; 15c), having an input shaft (11; 11a; 11c) that is coupled with at least one power-splitting gear set (16; 16c; 17; 17c), wherein said at least one power-Splitting gear set is capable of being coupled with an output shaft (40, 40a), and having two electrical machines (26, 27) coupled with the at least one power-splitting gear Bet (16; 16c; 17; 17c), wherein means (47, 50, 51) are provided for coupling the input shaft (11; 11a; 11c) with the output shaft (40; 40a) while the two electrical machines (26, 27) and the at least one power-splitting gear set (16; 16c, 17; 17c) are bridged, wherein the means (47, 50, 51) serve to establish a positive-locking connection between the input shaft (11; 11a; 11c) and at least one transmission shaft (31, 32, 44) capable of being coupled with the output shaft (40, 40a), or between said input shaft and the output shaft (40; 40a), wherein two transmission shafts are provided, and wherein input gear wheels (1E through 5E, RE) are arranged on each said transmission shaft (31, 32), which said input gear wheels mesh with output gear wheels (1A through 5A, RA) arranged on the output shaft (40; 40a), and wherein elements (34 through 38) for the coupling of the input gear wheels (1E through 5E, RE) and the output gear wheels (1A through 5A, RA) with the transmission shafts (31, 32) and the output shaft (40; 40a) are provided, and wherein a coupling between the two transmission shafts (31, 32) and the output shaft (40; 40a) exists at all times except during pauses to change gears.

9. A transmission (15; 15a; 15b; 15c), having an input shaft (11; 11a; 11c) that is coupled with at least one power-splitting gear set (16; 16c; 17; 17c), wherein said at least one power-splitting gear set is capable of being coupled with an output shaft (40, 40a), and having two electrical machines (26, 27) coupled with the at least one power-splitting gear set (16; 16c; 17; 17c), wherein means (47, 50, 51) are provided for coupling the input shaft (11; 11a; 11c) with the output shaft (40; 40a) while the two electrical machines (26, 27) and the at least one power-splitting gear set (16; 16c, 17; 17c) are bridged, wherein the means (47, 50, 51) serve to establish a positive-locking connection between the input shaft (11; 11a; 11c) and at least one transmission shaft (31, 32, 44) capable of being coupled with the output shaft (40, 40a), or between said input shaft and the output shaft (40; 40a), wherein the at least one transmission shaft is designed as a hollow shaft (44) that surrounds the input shaft (11a).

10. A transmission (15; 15a; 15b; 15c), having an input shaft (11; 11a; 11c) that is coupled with at least one power-splitting gear set (16; 16c; 17; 17c), wherein said at least one power-splitting gear set is capable of being coupled with an output shaft (40, 40a), and having two electrical machines (26, 27) coupled with the at least one power-splitting gear set (16; 16c; 17; 17c), wherein means (47, 50, 51) are provided for coupling the input shaft (11; 11a; 11c) with the output shaft (40; 40a) while the two electrical machines (26, 27) and the at least one power-splitting gear set (16; 16c, 17; 17c) are bridged, wherein the epicyclic gear sets are planetary gear sets (16, 17) having ring gears, sun gears, and planetary gear carriers, wherein the ring gears (18, 19) are coupled with the input shaft (11; 11a; 11c), the sun gears (23; 23a; 24; 24a) are coupled with the electrical machines (26, 27), and the planetary gear carriers (28, 29) are coupled with the transmission shafts (31, 32), or wherein the epicyclic gear sets are planetary gear sets (16, 17) having ring gears, sun gears, and planetary gear carriers, wherein the ring gears (18, 19) are coupled with the transmission shafts (31, 32, 44), the sun gears (23, 24) are coupled with the electrical machines (26, 27), and the planetary gear carriers (28, 29) are coupled with the input shaft (11; 11a; 11c).

11. A transmission (15; 15a; 15b; 15c), having an input shaft (11; 11a; 11c) that is coupled with at least one power-splitting gear cats (16; 16c; 17; 17c), that is/are capable of being coupled with an output shaft (40, 40a), and having two electrical machines (26, 27) coupled with the at least one power-splitting gear set (16; 16c; 17; 17c), wherein means (47, 50, 51) are provided for coupling the input shaft (11; 11a; 11c) with the output shaft (40; 40a) while the two electrical machines (26, 27) and the at least one power-splitting gear set (16; 16c, 17; 17c) are bridged, wherein the input shaft (11) and the output shaft (40; 40a) each have a brake device (13, 42).

\* \* \* \* \*